(12) United States Patent
Baldwin et al.

(10) Patent No.: US 12,144,454 B2
(45) Date of Patent: Nov. 19, 2024

(54) COOKING DEVICE

(71) Applicant: Breville USA, Inc., Torrance, CA (US)

(72) Inventors: Douglas Baldwin, Arvada, CO (US);
Kevin Klonoff, Kent, WA (US);
Christopher Charles Young, Seattle, WA (US)

(73) Assignee: Breville USA, Inc., Torrance, CA (US)

( * ) Notice: Subject to any disclaimer, the term of this patent is extended or adjusted under 35 U.S.C. 154(b) by 0 days.

(21) Appl. No.: 17/691,946

(22) Filed: Mar. 10, 2022

(65) Prior Publication Data
US 2022/0257043 A1 Aug. 18, 2022

Related U.S. Application Data

(63) Continuation of application No. 17/271,538, filed as application No. PCT/US2019/048757 on Aug. 29, (Continued)

(51) Int. Cl.
*A47J 27/10* (2006.01)
*A23L 3/00* (2006.01)
(Continued)

(52) U.S. Cl.
CPC ............... *A47J 27/10* (2013.01); *A23L 3/00* (2013.01); *A23L 3/005* (2013.01); *A23L 5/00* (2016.08);
(Continued)

(58) Field of Classification Search
CPC .......... A47J 27/10; A47J 27/004; A47J 27/18; A47J 36/2405; A47J 36/321; G01K 13/00;
(Continued)

(56) References Cited

U.S. PATENT DOCUMENTS 9,074,948 B2 7/2015 Rankin
2013/0294477 A1* 11/2013 Rankin .................... A47J 36/32
374/45
(Continued)

FOREIGN PATENT DOCUMENTS

EP 2950611 A1 12/2015
WO 2016144827 A1 9/2016

OTHER PUBLICATIONS

European Search Report and Written Opinion for Application No. 19854891, mailed May 17, 2022, 6 pages.

*Primary Examiner* — Sang Y Paik
*Assistant Examiner* — Bonita Khlok
(74) *Attorney, Agent, or Firm* — KDW Firm PLLC

(57) ABSTRACT

Predictive cooking systems and methods. A representative system can include a cooking device submergible in a container of fluid and a memory device storing instructions for causing a processor to receive information and determine heater set point temperature and on time. The processor can receive information indicative of one or more characteristics of a food item to be cooked in the fluid and a desired food temperature. The processor can perform a control process that can include sending instructions for controlling a heater, obtaining a temperature measurement of the fluid from a temperature sensor, determining a measurement of power delivered to the heater, determining constants related to corresponding physical characteristics of the fluid and/or the container based on at least one of the temperature measurement and the measurement of power, and determining a food temperature of the food item.

19 Claims, 12 Drawing Sheets

Related U.S. Application Data 2019, which is a continuation-in-part of application No. 16/116,460, filed on Aug. 29, 2018, now Pat. No. 11,213,158.

(51) Int. Cl.
    *A23L 3/005*     (2006.01)
    *A23L 5/00*     (2016.01)
    *A23L 5/10*     (2016.01)
    *G01K 13/00*     (2021.01)
    *G01K 17/00*     (2006.01)

(52) U.S. Cl.
    CPC ................ *A23L 5/13* (2016.08); *G01K 13/00* (2013.01); *G01K 17/00* (2013.01); *A23V 2002/00* (2013.01)

(58) Field of Classification Search
CPC . G01K 17/00; A23L 3/00; A23L 3/005; A23L 5/00; A23L 5/13; A23L 5/10; A23V 2002/00
USPC ....... 219/487, 494, 496–497; 99/326, 329 R, 99/330–331, 333–334, 339, 341–343; 426/233
See application file for complete search history.

(56) References Cited

U.S. PATENT DOCUMENTS

2017/0139385 A1*   5/2017   Young ..................... A47J 27/04
2017/0231417 A1     8/2017   Cote
2018/0055270 A1*   3/2018   Heimendinger ...... A47J 36/321
2019/0198136 A1*   6/2019   Hou ....................... G16C 20/90

* cited by examiner

COOKING DEVICE

TECHNICAL FIELD

This present technology is directed to a cooking device.

BACKGROUND

Sous vide cooking is a method of cooking where the food is sealed in a plastic bag and then placed in a hot water bath until the food reaches the desired internal temperature. The hot water bath temperature is typically much lower than used for cooking in an oven or on a stove. Although sous vide cooking does typically take longer than traditional methods, the result is moist food that is evenly cooked, ensuring that the inside is properly cooked without overcooking the outside.

With traditional cooking methods, heat flows from a burner to a pan then into the food, or the elements of an oven heat the air around the food. Because the air in the oven and the metal in the pan are much hotter than the desired internal temperature of the food, the food cooks more on the outside and the food must be removed from the heat at just the right time. These traditional cooking methods have a narrow window of time in which the food is properly heated. If the food is removed from the heat too early or too late, the food will be either over- or undercooked. But when cooking with water, instead of an oven or a pan, the water temperature can be set just high enough to get the food to the preferred temperature without having to remove it from the heat at exactly the right time. Therefore, there is a much wider window of time in which the food is at the desired temperature. However, present approaches to setting the fluid temperature result in long cooking times.

SUMMARY OF THE INVENTION

It is an object of the invention to address one or more of the above discussed disadvantages, or at least provide a useful alternative to the above-mentioned cooking methods.

In a first aspect the present invention provides a method of cooking a food item in a fluid, the method including the steps of:

receiving food item information indicative of one or more characteristics of a food item to be cooked in the fluid;
receiving a desired food temperature;
receiving information related to a predetermined acceptable temperature gradient across the food item;
controlling a heater for heating the fluid according to heater control information related to a set point temperature and a heater operation period;
obtaining a temperature measurement;
facilitating determination of a measurement of power delivered to the heater;
facilitating determination of one or more process parameters related to one or more corresponding physical characteristics related to an environment surrounding the food item based on at least one of the temperature measurement and the measurement of power;
facilitating determination of an estimate of a food temperature of the food item based on the one or more process parameters, the temperature measurement, and/or the measurement of power;
facilitating determination of updated heater control information based on the food temperature, the one or more process parameters, the temperature measurement, and/or the measurement of power such that:

the food item substantially reaches the desired food temperature while maintaining or subceeding the predetermined acceptable temperature gradient across the food item; and
after the heater operation period, the fluid cools to substantially the desired food temperature within a predetermined time period, and the food item substantially reaches the desired food temperature within the predetermined time period; and
controlling the heater according to the updated heater control information until the food temperature substantially reaches the desired food temperature.

In a second aspect the present invention provides a cooking device for cooking a food item in a container using the method of the first aspect, the cooking device being in energetic communication with the fluid in the container for cooking the food item, the cooking device including:

the heater for heating the fluid;
a temperature sensor for providing the temperature measurement;
at least one memory device for storing executable instructions for operating the cooking device; and
at least one processor adapted to execute the executable instructions to perform the method of the first aspect.

BRIEF DESCRIPTION OF THE DRAWINGS

Embodiments of representative predictive cooking systems and methods described herein may be better understood by referring to the following Detailed Description in conjunction with the accompanying drawings, which relate to mere preferred embodiments only, and in which like reference numerals indicate identical or functionally similar elements.

Figure 1:
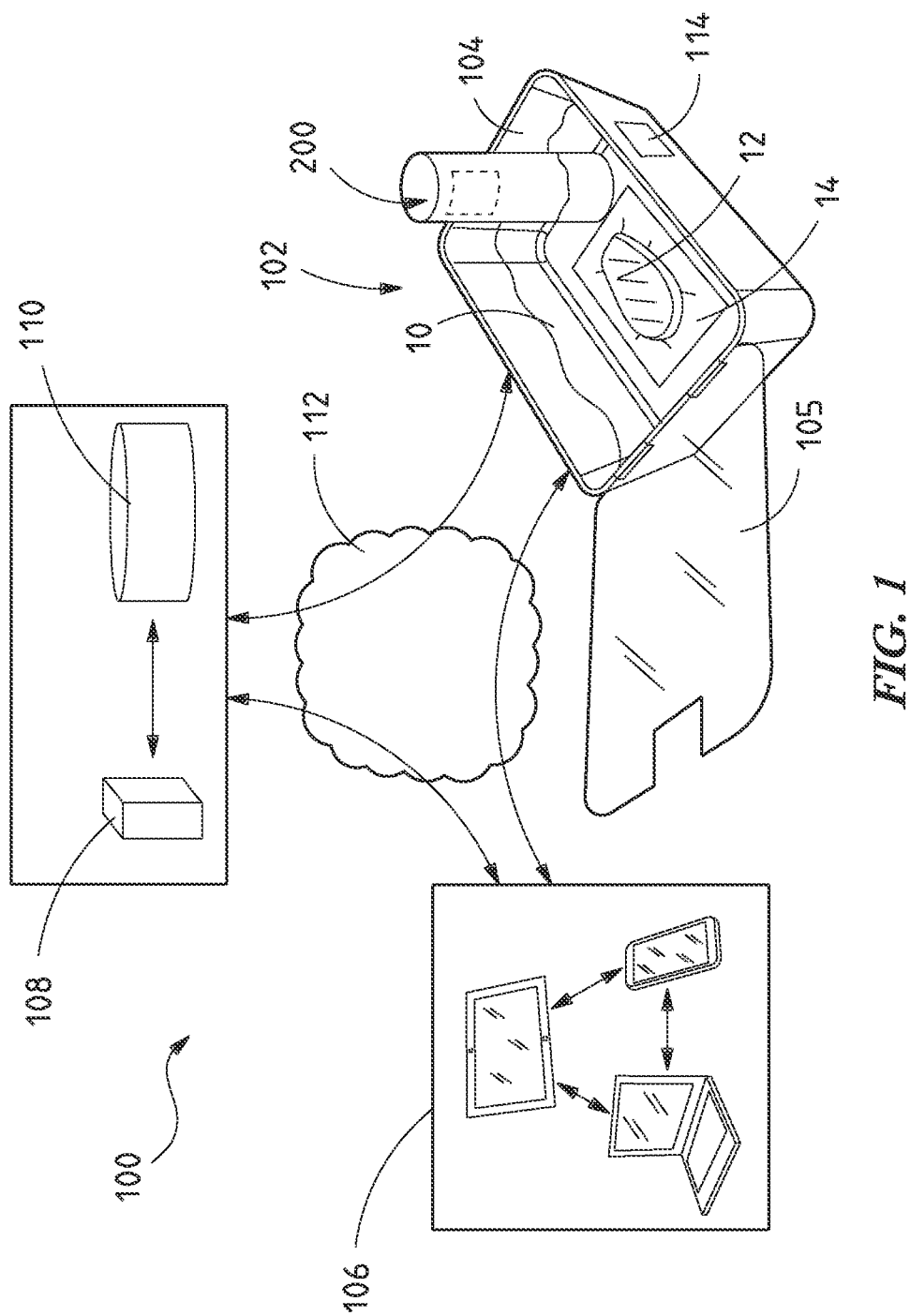
FIG. 1 illustrates a schematic view of a predictive cooking system according to some embodiments of the present technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and/or alternatives of the technology falling within the scope of this disclosure.

DETAILED DESCRIPTION

Overview

Methods and systems for predictive cooking are disclosed. The disclosed technology can be used to estimate various unknown process parameters related to a cooking environment. For example, in a sous vide cooking environment, container size and shape, fluid mass and volume, thermal conductivity of the container, evaporation losses, and food item characteristics are examples of potentially unknown process parameters.

In some implementations, these parameters are determined by solving a physical model based on changes in measured fluid, heating element temperature, and/or known power delivered to the fluid via a heater. Data on how the temperature of the fluid responds over time to a known power input can be used to estimate the constants in the physical model. The physical model can then be used to predict the fluid temperature in the future by iterating the model forward in time. Accordingly, the core temperature of the food item being cooked and the temperature gradient from the surface of the food item to its core can be predicted. From these predictions the set point temperature which the heater seeks to attain and heater operation period can be optimized to cook the food item as fast as possible or to be done at a selected time of day without exceeding an acceptable temperature gradient.

In traditional sous vide cooking the temperature of the fluid rises to a set point corresponding to the desired food temperature of the food item and the temperature of the fluid is maintained at the desired food temperature until the food item substantially reaches the desired food temperature, resulting in very little, if any, temperature gradient across the food. By accepting a small temperature gradient within the food, the fact that hotter water heats food faster than cooler water can be used to significantly reduce the heating time of sous vide cooking. Similarly, in a fluid other than water, such as air in an oven or toaster, higher air temperatures increase the food's surface temperature and so significantly reduce the heating time. The disclosed cooking devices control the heater at a set point temperature above the traditional sous vide set point temperature, and then control the heater at a lower set point temperature, allowing the fluid to cool back to the desired food temperature. Likewise, when the fluid is air, or air and water vapor, the predictive cooking system can increase the temperature and/or change relative humidity (if the device is capable of controlling humidity) to accelerate cooking and then adjust the temperature and/or relative humidity to hold the desired final temperature for extended time.

General Description

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below to avoid unnecessarily obscuring the relevant description.

FIG. 1 illustrates a schematic view of a predictive cooking system 100 according to a representative implementation. The predictive cooking system 100 can include a cooking appliance 102, one or more processors 108, and one or more memory devices 110 communicatively coupled together via one or more communication channels, such as communication networks 112. A client computing device 106 can communicate with the system 100 via the communications networks 112 to provide input to the system. For example, a user can use the client computing device 106 to provide a desired food temperature, an acceptable temperature gradient across the food item, food item characteristics (e.g., type, weight, thickness, shape) and container information related to container characteristics (e.g., size, shape, volume).

The cooking appliance 102 can include a container 104 filled with a fluid 10, such as water, and a cooking device 200, such as a thermal immersion circulator or sous vide device, at least partially submerged in the fluid 10. In some implementations, the cooking appliance 102 can include an information label 114 and a lid 105 configured to cover the container 104 in order to help control heat loss and evaporation of the liquid 10. In the illustrated example, a food item 12, such as a steak, can be placed in a resealable plastic bag 14 and placed in the liquid 10. As the cooking device 200 heats the liquid 10, the food item 12 can be cooked according to the predictive cooking methods disclosed herein. In other implementations, the cooking appliance 102 can comprise an oven or pressure cooker, for example. In these embodiments, the cooking appliance substantially incorporates the cooking device, in that an oven includes the container 104, being an oven cavity, filled with the fluid 10, being air and/or steam in the oven cavity. Other examples of cooking appliances that substantially incorporate the cooking device are convections ovens with humidity control, or pressure cookers.

Figure 2A:
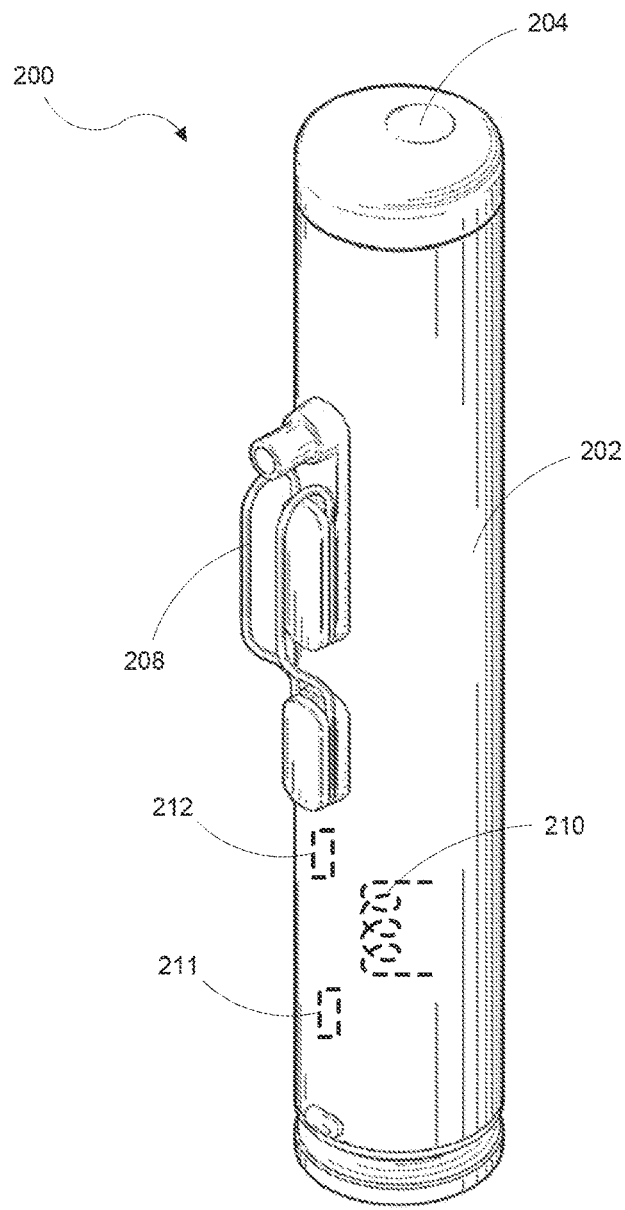
FIG. 2A is an isometric view of a representative cooking device.
Figure 2B:
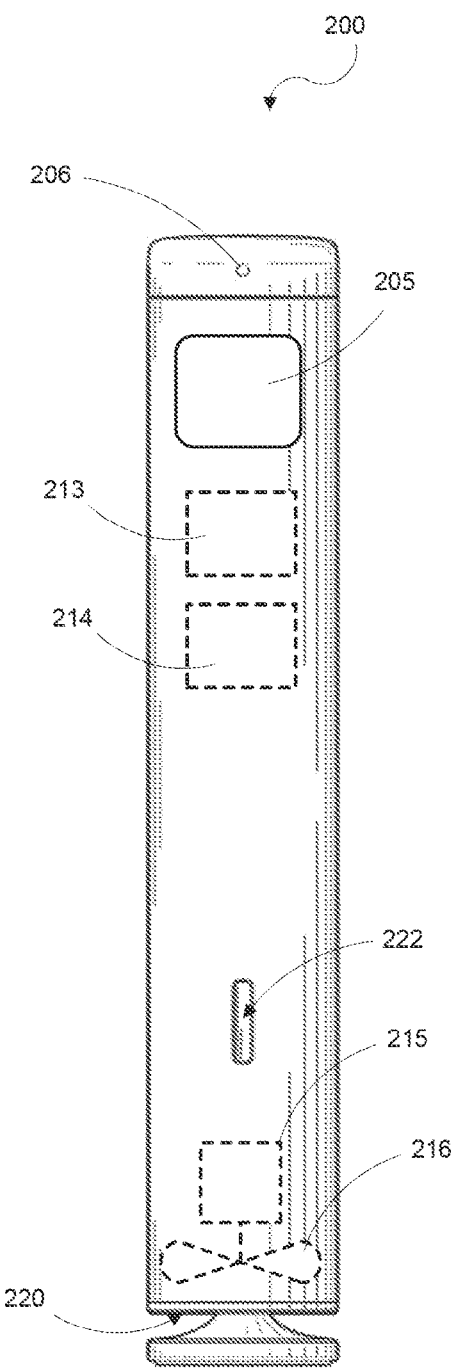
FIG. 2B is a front view in elevation of the cooking device shown in FIG. 2A.

As shown in FIG. 2A, the cooking device 200 can include a housing 202 and a mounting clip 208 adapted to attach the cooking device 200 to the container 104 (FIG. 1). The housing 202 can contain a heater 210 and sensors, such as a temperature sensor 211, a pressure sensor 212, and/or a humidity sensor. In embodiments where the cooking device 200 includes the container 104, the cooking device 200 may include a second pressure sensor (not shown) to provide a container pressure measurement indicative of a pressure in the container 104. With further reference to FIG. 2B, the housing 202 can contain a motor 215 operatively coupled to an impeller 216 for circulating liquid 10 through inlet 220, across heater 210, and out a discharge outlet 222. The cooking device 200 can include a processor 213 and a memory device 214 (which may be monolithically integrated with the processor). The cooking device 200 can also include a control button 204 (e.g., on/off), an indicator light 206, and/or a user interface 205.

Figure 3:
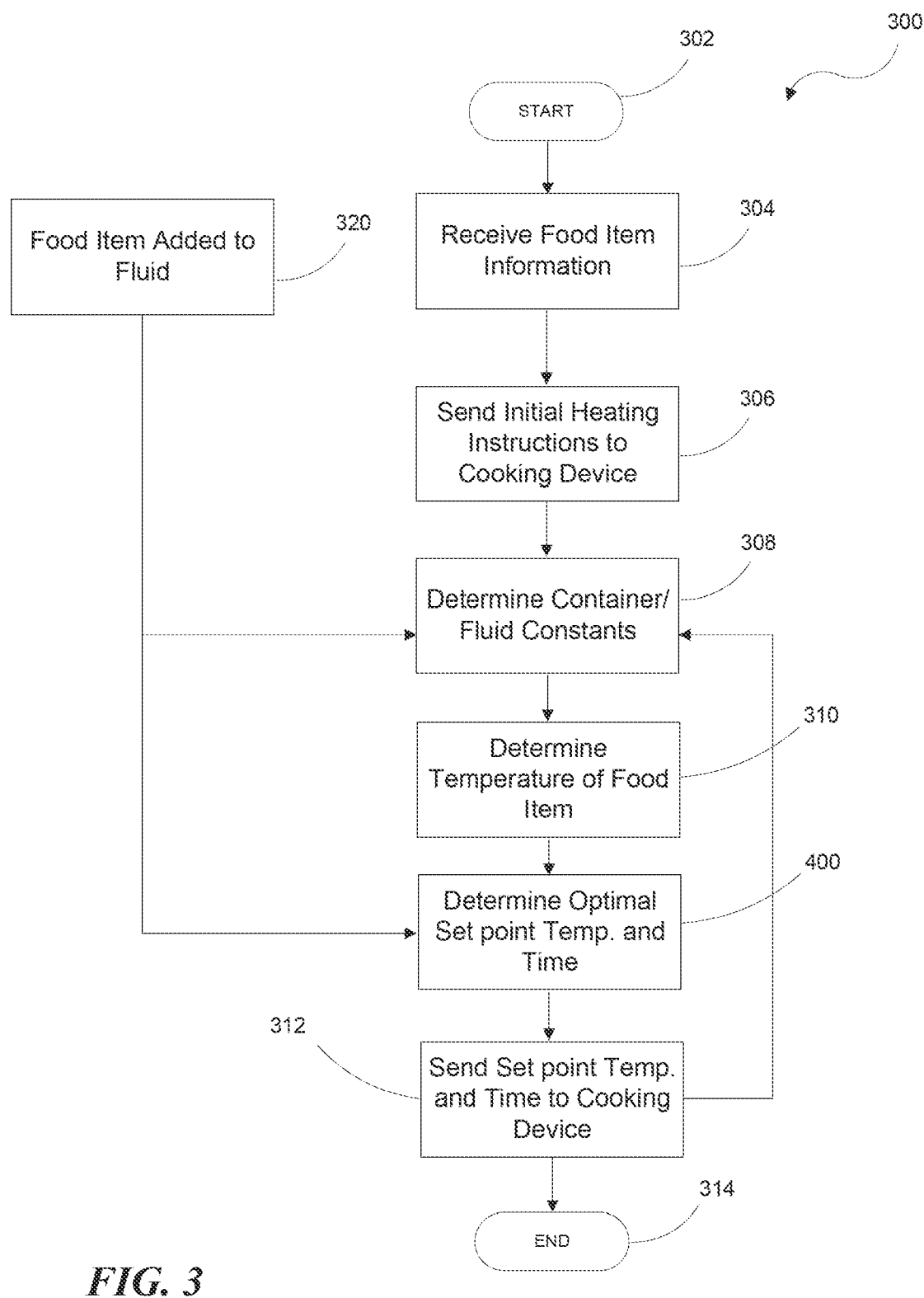
FIG. 3 is a flow diagram showing a method of operation of a processor-based predictive cooking system according to some implementations of the present technology.

FIG. 3 is a flow diagram showing a method of operation 300 of a processor-based predictive cooking system according to some embodiments of the present technology. The method 300 starts at 302. For example, the method 300 can start in response to activation of a specific application on a client computing device 106 (FIG. 1) or via the control button 204 and/or user interface 205 of the cooking device 200 (FIGS. 2A and 2B).

At 304, the system receives information indicative of one or more characteristics of the food item 12. For example, in the case of meat (e.g., steak 12), the system can receive information related to species, cut, thickness, shape, weight, quantity, and the like. Although the devices, systems and methods are described herein with respect to preparing a meat food item, other types of foods can be prepared using the disclosed technology, such as fish, vegetables, puddings, and custards, to name a few.

At 306, the system sends initial heating instructions to the cooking device 200 in order to start heating the fluid 10 (FIG. 1) and obtaining measurements via the temperature and pressure sensors 211/212 (FIGS. 2A and 2B), for example. Alternatively, the initial heating instructions may be set by the user. In some implementations, the system can receive geographic location (e.g., GPS) information from the user device to estimate the atmospheric pressure based on an altitude of the geographic location rather than or in addition to the pressure sensor 212 (FIG. 2A). In some implementations, the cooking device 200 includes a humidity sensor to provide a measurement of humidity in the container. In other implementations, the cooking device 200 includes a second pressure sensor to provide a container pressure measurement, as for implementations where the cooking device 200 incorporates the container, the pressure in the container may be different to the ambient pressure measured by the pressure sensor 212, or estimated on the basis of the geographic location information. A measurement of power delivered to the heater 210 (FIG. 2A) can also be determined using calculations based on current, voltage, and/or pulse width input to the cooking device. In some implementations, the initial heating instructions can be determined based on past measurements and calculations which can be used as a starting point to estimate the physical characteristics of the fluid 10 and the container 104 (FIG. 1), for example.

At 308, the system can determine one or more process parameters related to corresponding physical characteristics of the fluid 10 and the container 104 (FIG. 1) based on changes in temperature relative to the power delivered to the heater 210 (FIG. 2). The system can use least-squares, Kalman filter, or other similar mathematical methods for fitting a physical model to the measured data to estimate, or determine, the process parameters such as fluid mass/volume $c_1$, thermal conductivity of the container to the environment $c_2$, an offset $c_3$ that depends on air temperature and dew point, and an evaporation loss to the environment $c_4$ (referred to collectively as $c_i$). For example, in some implementations, the system can use the following physical model to determine the above constants related to corresponding physical characteristics of the fluid 10 and the container 104 (FIG. 1):

$$\frac{dT}{dt} \approx c_1(P-F) - c_2T + c_3 - c_4H(T) \quad \text{Equation 1}$$

where P (t) is the power delivered to the heater 210 as a function of time (t), F(t) is the energy going into the food item 12 as a function of time (t), T (t) is the fluid's temperature as a function of time (t), H(T(t)) is the specific humidity at the fluid's surface as a function of time (t), the $c_i \geq 0$ may change in time. This change in process parameters over time can be accomplished with a process noise in a sigma-point Kalman filter or with weights in a least-squares fit, for example. Note that $c_1 \propto V_{fluid}^{-1}$.

In some implementations, information related to the fluid 10 and the container 104 can be input by the user (FIG. 1). For example, the user could provide the dimensions of the container 104 (e.g., length, width, and/or height) and/or the container material, such as glass, metal, or insulated material. This information can be used to refine the physical model by replacing some process parameters with known process parameters. In some implementations, the characteristics of the container 104 can be known to the system and/or need only be identified by name, code number, or a bar code located on the container, for example, or predetermined by the manufacturer. The user can enter the name or code, or scan a bar code via camera from a label 114 positioned on the container 104 using a client computing device 106. The system can retrieve all necessary data from memory (e.g., memory 110) related to the identified container.

At 310, the system can approximate the temperature of the food item 12 with:

$$\frac{\partial \tau}{\partial t} = \alpha \left( \frac{\partial^2 \tau}{\partial r^2} + \frac{\beta}{r} \frac{\partial \tau}{\partial r} \right) \quad \text{Equation 2}$$

$$\tau(r, t_o) = \tau_0, \frac{\partial \tau}{\partial r}(r=0, t) = 0 \quad \text{Equation 3}$$

$$k\frac{\partial \tau}{\partial r}(r=R, t) = h[T(t) - \tau(r=R, t)], \quad \text{Equation 4}$$

where $\tau$ ($0 \leq r \leq R$, $t \geq t_0$) is an estimate of the food's temperature, $t_0$ is when the food is added, when cooking sous vide or in a pressure cooker. When cooking in an oven, additional terms are added to the right-hand side of Equation 4 to account for water vapor evaporating from and condensing on the food's surface. $\alpha = k/(\rho c_p)$ is thermal diffusivity, k is thermal conductivity, $\rho$ is density, $c_p$ is specific heat, 2R is the characteristic thickness, $0 \leq \beta \leq 2$ is the characteristic shape, h is surface heat transfer coefficient, and $\tau_0 \approx 5°$ C. is the initial temperature. The constants $\alpha$, k, $\rho$, $c_p$ are selected based on food type and cut. For example, whether the food item is beef or pork and whether it is a flank steak or a tenderloin. From the temperature distribution the system can estimate the change in energy of the food. Given a temperature profile and a $\beta$, the system performs a numerical integration or quadrature to estimate the energy. The characteristic shape $\beta$ describes how heat is transferred from the boundaries of the food item and can vary from 0 to 2. If the food item is viewed relative to three axes (i.e., x, y, and z), values near zero indicate that the heat is coming from +/−x but not y or z, values near 1 indicate that the heat is coming from +/−x and +/−y but not z, and values near 2 indicate that the heat is coming from all directions, that is, $\beta$ is representative of the characteristic dimensionality of the food item's heat transfer system, minus one.

In situations where multiple food items are to be cooked at the same time the system can use the average thickness and total, combined weight of the food items. In some implementations, the system assumes that all the items are approximately uniform. In other cases, if the items are of disparate shapes, the system can adjust the algorithm so it takes longer to heat so as to mitigate under- and overcooking.

In some implementations, the system can receive shape information related to the food item via the client device 106 (FIG. 1). For example, the client device's camera can be used to capture image date (e.g., via available augmented reality toolkits) which can be related to the food item's characteristic shape parameter β. The β parameter characterizes different shapes, namely plane, cylinder, and sphere/cube, with values ranging from 0 to 2, respectively. In some implementations, the system can draw a box around the food item such that the dimensions, e.g., x, y, z, of the box can be used to estimate the food item's characteristic shape parameter β.

In some implementations, the shape of the food item to be cooked can be matched with an image of a similar food item shape presented in a user application. In some implementations, the system can use deep learning from a database of labeled images for food item detection based on a photo of the food item to be cooked. In some implementations, image data technology can be used for determination of the fat content of a food item by using its average color (e.g., CIELAB color space) derived from a photo of the food item.

At 400, the system can estimate an optimized cooking program (e.g., heater set point temperature and heater on time). An optimized cooking program seeks to heat the core of the food item while maintain or subceeding a predetermined acceptable temperature gradient across the food item, violation of which would risk overcooking an exterior of the food when attempting to heat the core of the food. An optimized cooking program similarly seeks to determine a set point temperature and heater operation period such that the food item substantially reaches the desired food temperature while maintaining or subceeding a predetermined acceptable temperature gradient across the food item, and, after the heater operation period, the fluid cools to substantially the desired food item temperature within a predetermined time period, and the food item substantially reaches the desired food temperature within the predetermined time period. This can be referred to as an aggressiveness constraint which informs how hot the edges of the food item can get. The optimization process 400 is more fully described below with reference to FIG. 4.

At 312, executable instructions (e.g., the cooking program) for controlling the heater can be sent to the cooking device, including heater control information related to a set point temperature and a heater operation period. Once the cooking program is sent to the cooking device the method can return to 308 to periodically (e.g., every 10-300 seconds) update the container/fluid process parameters, determine the food item temperature, and determine updated heater control information for the resulting optimized cooking program. Due to heat losses from conduction through the container and evaporation from the surface of the fluid, the fluid heats up more slowly over time. Therefore, the system can periodically recalculate the set point temperature and heater operation period to account for changes in the cooking environment.

At 314, the method can terminate, for example, when the food item reaches the desired food temperature. For example, the desired food temperature can be a selected core temperature of the food item corresponding to "rare" through "well-done" result in a steak. In some implementations, the system can receive an indication from a user via the client computing device 106 (FIG. 1) that the food item should be pasteurized or sterilized. In these cases, the fluid and food item can be maintained at the desired food temperature for a required amount of time, a pasteurization time period, based on known pasteurization time and temperature tables. In some cases, the heater may be controlled according to a higher set point temperature at least a brief amount of time to ensure pasteurization or sterilization is achieved.

At 320 the food item can be added to the fluid before, during, or after the initial heating instructions are sent to the cooking device at 306. For example, the food item can be added to the fluid at 308 or 400. The system can receive an indication from a user via the client computing device 106 that the user has added the food item to the fluid. In some implementations, the system can detect when the food item has been added by monitoring changes in the fluid temperature relative to the power delivered to the heater. For example, if the fluid temperature, as indicated by the temperature measurement, begins rising slower than previously determined it can be inferred that the food item has been added to the fluid. If a user adds the food item early, before the fluid reaches the set point temperature, the system can detect this and adapt accordingly. In some implementations the system uses a predictor-correct algorithm, to monitor deviance from the prediction to detect the addition of food and other user events (e.g., adding water).

Figure 4:
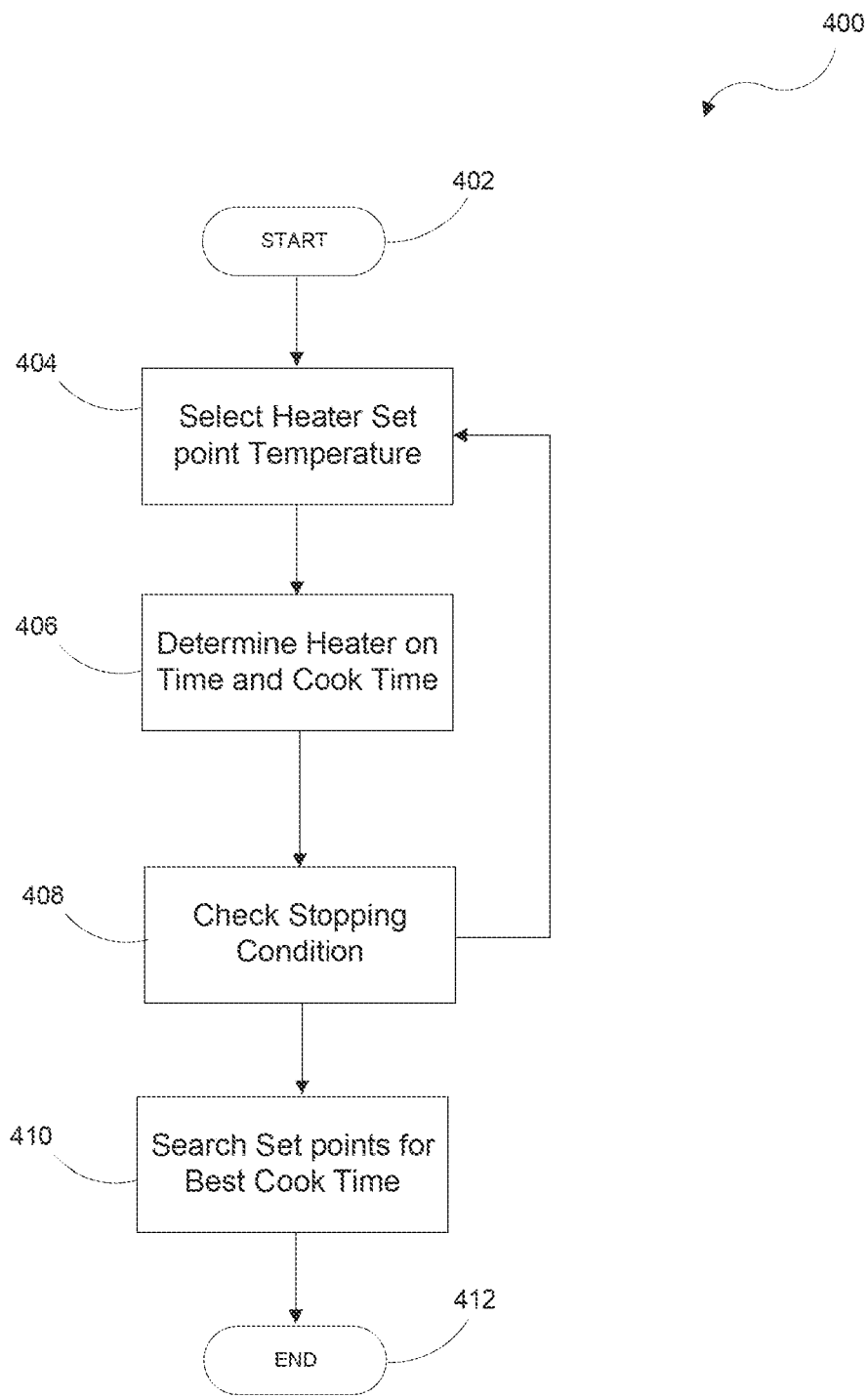
FIG. 4 is a flow diagram showing a method of operation for determining a cooking program according to some implementations of the present technology.

FIG. 4 is a flow diagram showing a representative method 400 for determining updated heater control information for an optimized cooking program according to some embodiments of the present technology. The system predicts the outcomes of multiple temperature set points. The system can project the outcome of each set point temperature forward in time, solving the heat equation (e.g., Equation 2) at multiple time steps, thereby predicting the temperature profile of the food item and the heat energy added to the food item over time. A Kalman filter can be used to estimate the different heat flows to compute the fluid temperature at the next time step. In some implementations, a shooting method can be used to construct a valid cooking program that heats the core of the food item to the desired food temperature while maintaining or subceeding the acceptable temperature gradient constraints (e.g., aggressiveness factor). The fluid temperature of a valid cooking program will match the core temperature in a predetermined period of time within which the food item is first fully heated. In embodiments where the fluid is air, and the heat capacitance of the heating element exceeds that of the fluid, the heating element temperature of a valid cooking program will match the core temperature in a predetermined period of time within which the food item is first fully heated. Preferably, the predetermined period of time is between 10 to 300 s. The valid cooking programs can then be searched to obtain the cooking program with the shortest cooking time. In some implementations, the user can opt for a less evenly heated final product (e.g., higher temperature gradient and/or error in core temperature) to reduce the amount of time to cook the food item or for foods in which the predetermined acceptable temperature gradient should be higher for better culinary results. The system can provide feedback to the user to alert the user that reduced cooking time may impact the final characteristics of the food item.

At 402, the optimization program starts with measurements from how the fluid has heated during method of operation 300 (FIG. 3) and input from the user, as indicated above, including a desired food or core temperature, $T_0$, for the food item and an acceptable temperature gradient across the food item, that is from a surface to a core of the food item.

At 404, the method selects a set point temperature for evaluation. The optimization program searches over all possible temperature set points—the temperature the cooking device tries to heat the fluid to before, according to updated heater control information, cooling down to the user's desired food temperature, just as the food's core temperature comes up to that temperature.

At 406, the optimization program computes the heater operation period given the selected set point temperature. The heater operation period is the time at which the cooking device should change its set point from the initially selected set point temperature, which according to presently disclosed principles is generally higher than the desired food temperature $T_0$, to the desired temperature $T_0$. The optimization program steps the system state forward in time: at each step, determining the fluid temperature, fluid volume/mass, and the food item's temperature profile (using the determined fluid temperature).

In some implementations, the heater operation period can be estimated as the period of time until the food item's surface reaches a maximum value or the period of time until the food item's core reaches a predetermined threshold value. The food item will continue heating (e.g., carryover effect) after the set point temperature has been changed from the set point temperature down to the user's desired-food temperature due to the heat capacitance of the fluid and/or the heating element. This is accounted for as the heating or cooking time, which is usually longer than the heater operation period, and is when the food's core is estimated to be $T_0-\delta$ ($\delta$=acceptable variation from desired core temperature). The algorithm seeks to optimize the heating time. In some implementations, the heating time can be estimated using a shooting method as discussed above.

At 408, the algorithm might stop for several reasons. For example, the set point temperature used in the last step is within ε of the temperature set point that gives the best heating time. This ε might depend on the current state of the system or the estimate; for example, if the optimization is run every N seconds (e.g., 10-300 seconds) and the fluid will not reach $T_0$ within N seconds, then any set point temperature at or above $T_0$ will produce the same result. Once a stopping condition is reached the optimization program returns to 404 to evaluate another set point temperature.

At 410, once all of the set point temperatures have been evaluated, the optimization program searches the acceptable set point temperatures for the one with the best cooking time. The best cooking time can be the shortest amount of time or could be a program that finishes within a user-selected period of time in the future or within a user-selected period of time of day. In some implementations, a binomial or bounded Newton's algorithm, a direct search algorithm, or a gradient based search algorithm can be used to search the set point temperatures to select the set point temperature that fulfils the optimized cooking program requirements. At 412, once the best set point temperature is selected, the set point temperature and heater operation period are returned to method of operation 300 for communication to the cooking device at 312 (FIG. 3).

Figure 5:
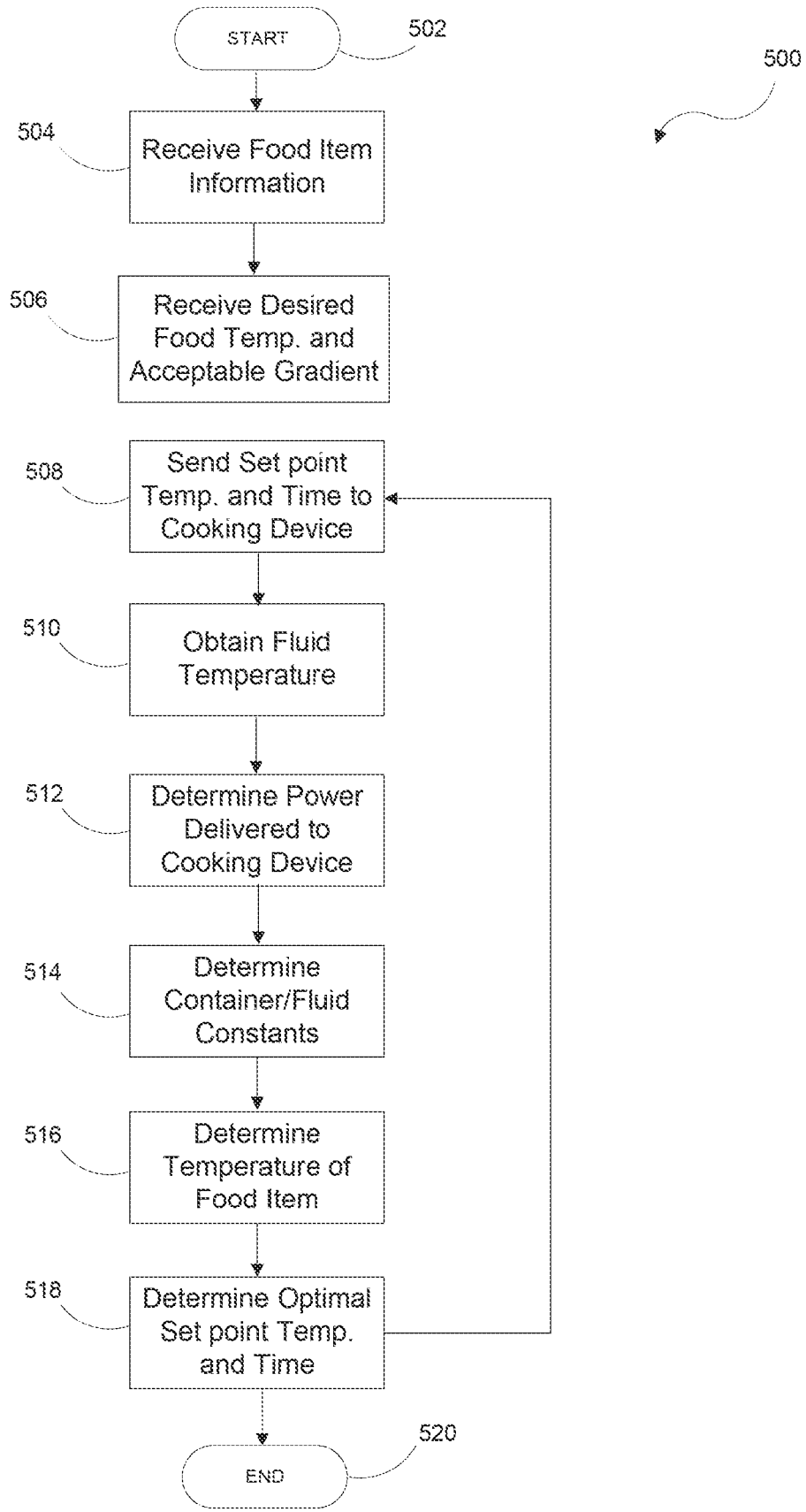
FIG. 5 is a flow diagram showing a representative method of operation of a processor-based predictive cooking system according to some implementations of the present technology.

FIG. 5 is a flow diagram showing a representative method of operation 500 of a processor-based predictive cooking system 100 according to some embodiments of the present technology. This method can be stored in any data storage device, e.g. a processor's on-chip memory, for the cooking device; alternatively, at least some of the method can be performed by the user device. The method can be applied to not only the device 200 but other cooking devices.

The method 500 starts at 502. For example, the method 500 can start in response to activation of a specific application on a client computing device 106 (FIG. 1) or via the control button 204 and/or user interface 205 of the cooking device 200 (FIGS. 2A and 2B). At 504 the system can receive information indicative of one or more characteristics of the food item 12 to be cooked (e.g. in the fluid 10). At 506, the system can receive a desired food temperature and information related to a predetermined acceptable temperature gradient across the food item 12. At 508, the system performs a process, including sending instructions for controlling the heater 210 (which could be a heater having a heating element positioned in a container of the fluid 10). The instructions can include information related to a set point temperature and a heater operation period. At 510, a temperature measurement (e.g. of the fluid 10, and/or of the heater 210) can be obtained from a temperature sensor 211. At 512, a measurement of power delivered to the heater 210 can be determined. At 514, one or more constants related to one or more corresponding physical characteristics (e.g. of at least one of the fluid 10 and the container 104), based on at least one of the temperature measurement and the measurement of power, can be determined. At 516, a food temperature of the food item 12 can be determined. At 518, the set point temperature and the heater operation period can be determined by solving for, e.g., a fluid temperature that brings the food item 12 to the desired food temperature while maintaining or subceeding the predetermined acceptable temperature gradient across the food item 12 and that results, after the heater operation period, in the fluid 10 cooling to substantially the desired food temperature within a predetermined time period, and the food item 12 substantially reaches the desired food temperature within the predetermined period. The process, (e.g., 508-518) can be repeated one or more times until the food temperature reaches the desired food temperature at which point the method process 500 ends at 520.

Figure 6:
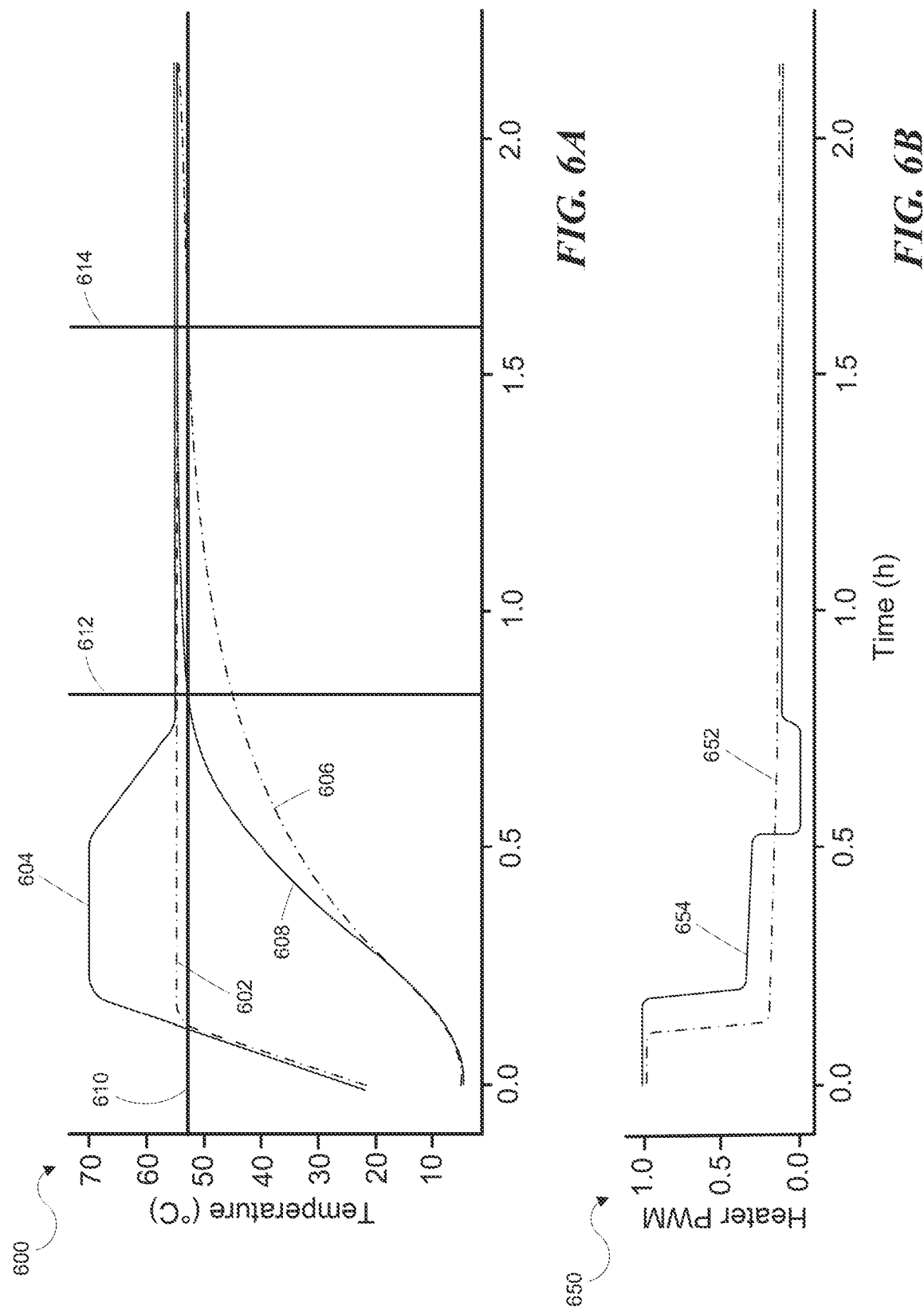
FIG. 6A is a graph showing temperatures over time for a fluid bath and a core temperature of a food item during traditional and predictive cooking processes.
FIG. 6B is a graph showing power input over time to a heater corresponding to the cooking temperatures shown in FIG. 6A.

FIG. 6A is a graph 600 showing temperatures over time for a fluid bath and a core temperature of a food item during traditional (dashed lines) and predictive (solid lines) cooking processes. In traditional sous vide cooking, the fluid temperature 602 is ramped up to the set point (e.g., 55° C.) and held at that temperature at least until the food item 606 reaches within e.g., 2° C. (line 610) of that set point temperature, which is also the desired food temperature. In the illustrated example, this occurs in approximately 96 minutes (line 614).

In contrast, using the disclosed predictive cooking technology, the fluid temperature 604 can be ramped up to well above the traditional set point temperature. In the illustrated example, the fluid temperature 604 can be raised to approximately 70° C. The fluid is held at that temperature for the heater operation period, in this case until approximately 30 minutes has elapsed, at which point the heater is turned off and the fluid is allowed to cool. The heater remains off and the fluid cools until the fluid temperature falls to the desired food temperature. Using the disclosed predictive cooking techniques, the fluid substantially reaches the desired food temperature within a predetermined period of time, and the food item 608 substantially reaches the desired food temperature within the predetermined period of time. In the illustrated example, the predetermined period of time occurs in approximately 50 minutes (line 612), which is approximately half the time of the traditional technique. At this point, the heater can be turned back on in order to maintain the fluid and food item at the desired food temperature until the user is ready to serve the food and/or to pasteurize the food item.

FIG. 6B is a graph 650 showing the power input over time to the heater in the traditional and predictive techniques. The power is shown in terms of pulse width modulation (PWM) as percent duty cycle. In traditional sous vide cooking, the heater 652 is ramped up at approximately 100% duty cycle until the set point is achieved. At that point the duty cycle is reduce to approximately 25% to maintain the set point temperature. Using the disclosed predictive techniques, the heater 654 can be ramped up at approximately 100% duty cycle until the fluid substantially reaches the higher set point temperature (e.g., 70° C.) with an acceptable tolerance. At that point the duty cycle is reduced to approximately 45% to maintain the set point temperature. The heater is then turned off (i.e., 0% duty cycle) to allow the fluid to cool to the desired fluid temperature, at which point the heater is turned on at approximately 25% duty cycle to maintain the fluid and food item at the desired food temperature.

Figure 7:
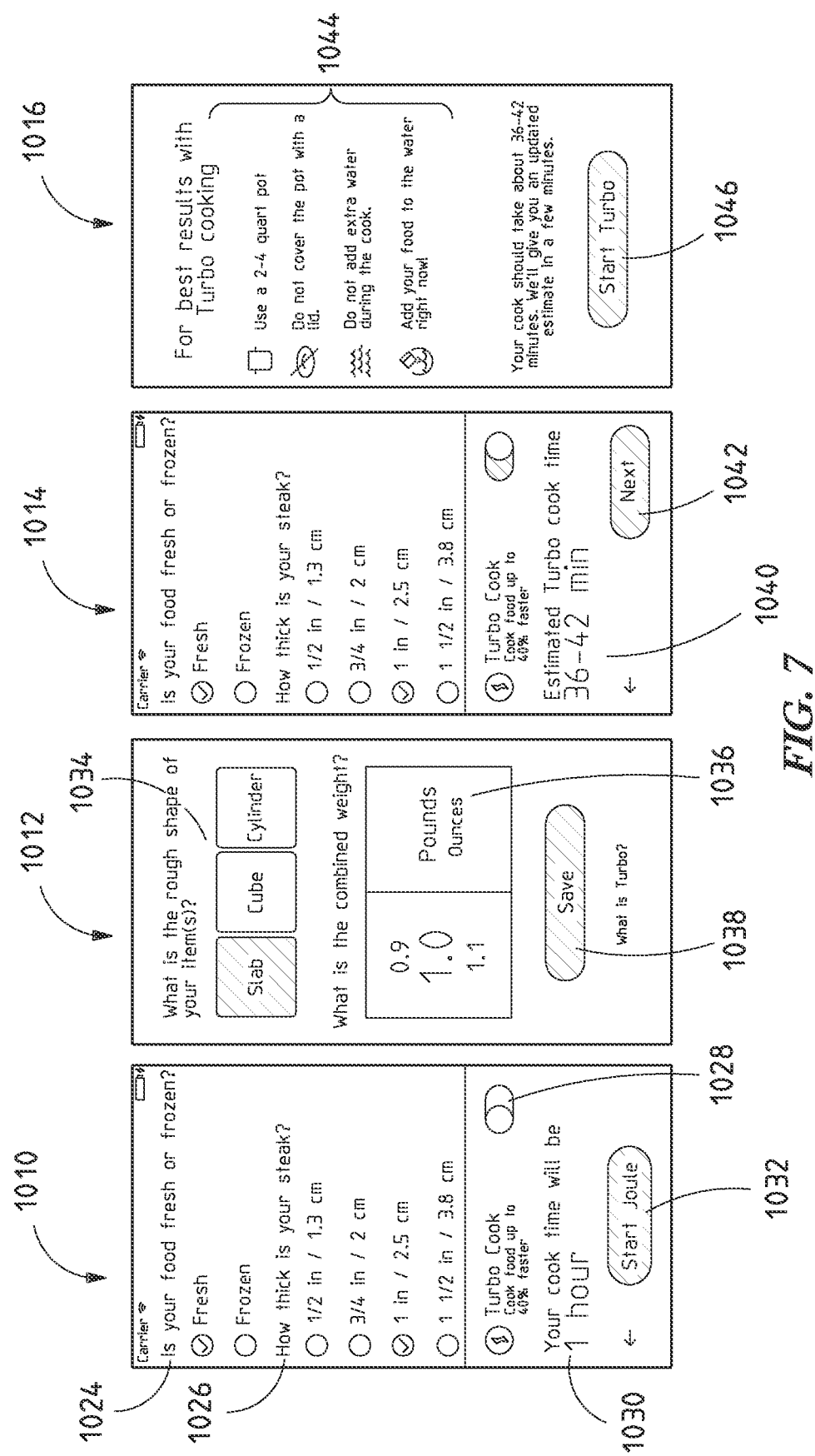
FIG. 7 is an illustration of a representative application user input interface.

FIG. 7 illustrates a representative user interface for receiving various user input regarding the food item to be cooked. For example, in screen 1010 the user can select whether the food item is fresh or frozen with radio buttons 1024 or other suitable graphical control element. In the case where the food item is a steak, the user can input the thickness of the steak with radio buttons 1026. Using this initial input the system can provide a cook time estimate 1030 corresponding to a conventional sous vide cooking process. The user can start this process by selecting the start button 1032. However, screen 1010 also offers the user the option to use the disclosed predictive cooking techniques (e.g., Turbo Cook) by selecting toggle 1028. In this case, the user can input additional information on screen 1012. For example, the user can input the rough shape of the food item by selecting the corresponding button 1034. The user can also input the weight of the food item(s) with spinner 1036. These settings can be saved with the save button 1038, at which point screen 1014 can provide an updated estimated cook time 1040 using the disclosed predictive cooking techniques. Screen 1014 can include a next button 1042 to advance to the next screen. In some implementations, a screen 1016 can provide information and instructions 1044 prior to starting the cooking process with start button 1046.

Figure 8:
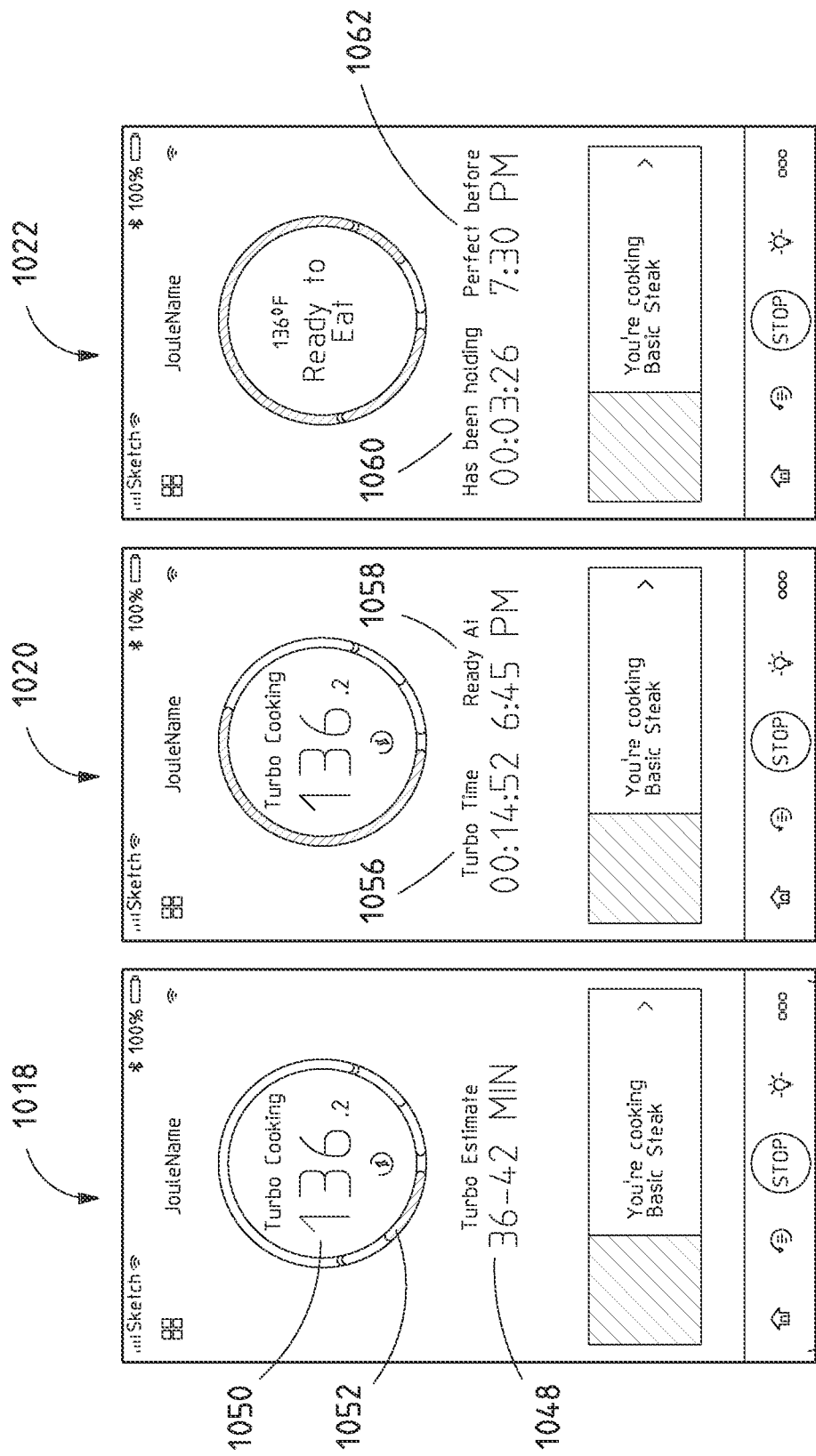
FIG. 8 is an illustration of a representative application status interface.

FIG. 8 illustrates representative status screens which indicate the current temperature and remaining cook time, for example. In an initial status screen 1018, the temperature 1050 is provided along with a progress indicator (e.g., circle) 1052. The estimated cook time 1048 is also provided. In some implementations, the various screens can include navigation controls 1054. In screen 1020, the time remaining 1056 is provided as well as a time of day 1058 at which the food item will be ready. Once the food item is ready, the system can maintain the item at the appropriate temperature until the user is ready to eat. Screen 1022 provides the length of time 1060 that the food item has been holding at the finished temperature and also provides a best before time 1062.

In some implementations, a representative cooking system can comprise a cooking device at least partially submergible in a container of fluid, the device including a heater and a temperature sensor, and at least one memory device storing instructions. The instructions can cause at least one processor to: receive information indicative of one or more characteristics of a food item to be cooked in the fluid; receive a desired food temperature; perform a control process; and to repeat the control process one or more times until the food temperature reaches the desired food temperature. The control process can include: sending instructions for controlling the heater, including information related to a heater set point temperature and a heater on time; obtaining a temperature measurement of the fluid from the temperature sensor; determining a measurement of power delivered to the heater; determining one or more constants related to one or more corresponding physical characteristics of at least one of the fluid and the container based on at least one of the temperature measurement and the measurement of power; determining a food temperature of the food item; and determining the heater set point temperature and the heater on time.

In some implementations, the set point temperature and the heater operation period can be determined by solving for the food item substantially reaching the desired food temperature while maintaining or subceeding a predetermined acceptable temperature gradient across the food item, and, after the heater operation period, the fluid cooling to substantially the desired food item temperature within a predetermined time period, and the food item substantially reaching the desired food temperature within the predetermined time period. The system can also wirelessly receive information related to the acceptable temperature gradient across the food item via a user device, such as a mobile phone or tablet. The system can provide feedback to the user device related to the predetermined acceptable temperature gradient. The set point temperature and the heater on time can be determined by solving for a fluid temperature that brings the food item to the desired food temperature at a user specified time while maintaining or subceeding a predetermined acceptable temperature gradient across the food item. The system can estimate at least one of a container type and a container size based on the one or more constants wherein the one or more process parameters can include at least one of a fluid volume value ($c_1$), a container thermal conductivity value ($c_2$), or an evaporative loss value ($c_4$). In some implementations, the system can receive at least one of a container type and a container size. The at least one of a container type and a container size can be received based on a name, number, or bar code positioned on the container. In some implementations, the system can detect when the food item is placed in the container based on a change in the temperature measurement and a change in the measurement of power. The system can identify if the food item is placed in the container before the fluid reaches the set point temperature and can adjust the set point temperature in response. The system can maintain the desired food temperature for a pasteurization time period selected based on the desired food temperature and the information indicative of one or more characteristics of the food item. The cooking device can include a pressure sensor and/or the system can receive geographic location information from the user device and estimate atmospheric pressure based on an altitude of the geographic location.

In some implementations, a representative cooking system can comprise a cooking device, the device including a heater and a temperature or pressure sensor, and at least one memory device storing instructions. The instruction can cause at least one processor to: receive information indicative of one or more characteristics of a food item to be cooked; receive a desired food temperature; and perform a process. The process can include sending instructions for controlling the heater, including a set point temperature, a heater operation period, or both a set point temperature and a heater operation period; obtaining a temperature measurement (T) related to cooking the food item from the sensor; determining a measurement of power (P) delivered to the heater; determining a fluid volume value ($c_1$), a container thermal conductivity value ($c_2$), or an evaporative loss value ($c_4$), by fitting a predetermined physical model to at least the temperature measurement (T) and the measurement of power (P); determining a food temperature ($\tau$) of the food item; and determining the set point temperature, the heater operation period, or both the set point temperature and the heater operation period.

The system can include instructions for causing the processor to repeat the control process one or more times until the food temperature reaches the desired food temperature. In some implementations, the cooking device is at least partially submergible in a container of fluid. The set point temperature and the heater operation period can be determined by solving for a fluid temperature whereby the food item substantially reaches the desired food temperature while maintaining or subceeding a predetermined acceptable temperature gradient across the food item, and, after the heater operation period, the fluid cools to substantially the desired food item temperature within a predetermined time period, and the food item substantially reaches the desired food temperature within the predetermined time period. The cooking device can be at least partially submergible in a container of fluid, and the physical model can comprise Equation 1, where (F) is energy going into the food, ($c_3$) is an offset dependent on air temperature and dew point, and (H) is the specific humidity at the fluid surface. The physical model can be solved using one of a least squares method or a Kalman filter method. The food temperature ($\tau$) can be determined with Equations 2-4, where $\tau$ ($0 \leq r \leq R$, $t \geq t_0$) is the food temperature, $t_0$ is when the food is added, $\alpha = k/(\rho c_p)$ is thermal diffusivity, k is thermal conductivity, $\rho$ is density, $c_p$ is specific heat, 2R is the characteristic thickness, $0 \leq \beta \leq 2$ is the characteristic shape, h is surface heat transfer coefficient, and $\tau_0$ is the initial food temperature. In some implementations, the set point temperature can be greater than the desired food temperature and the cooking device can be at least partially submergible in a container of fluid.

In some implementations, a representative method of heating a food item can comprise receiving information indicative of one or more characteristics of the food item to be cooked; receiving a desired food temperature; receiving information related to a predetermined acceptable temperature gradient across the food item; performing a process; and repeating the process one or more times until the food temperature reaches the desired food temperature. The process can include: sending instructions for controlling a heater positioned near the food item to be cooked, including information related to a set point temperature and a heater operation period; obtaining a temperature measurement relative to an environment proximate to the food item to be cooked; determining a measurement of power delivered to the heater; determining one or more process parameters related to one or more corresponding physical characteristics related to an environment surrounding a food item based on at least one of the temperature measurement and the measurement of power; determining an estimate of food temperature of the food item; and determining the set point temperature and the heater operation period by solving for a fluid temperature whereby the food item substantially reaches the desired food temperature while maintaining or subceeding a predetermined acceptable temperature gradient across the food item, and, after the heater operation period, the fluid cools to substantially the desired food item temperature within a predetermined time period, and the food item substantially reaches the desired food temperature within the predetermined time period.

In some implementations, the method is for heating a food item in a container of fluid and the determining the one or more process parameters can include determining at least one of a fluid volume value ($c_1$), a container thermal conductivity value ($c_2$), and an evaporative loss value ($c_4$) by fitting a physical model to at least the temperature measurement (T) and the measurement of power (P). The physical model can comprise Equation 1, where (F) is energy going into the food, ($c_3$) is an offset dependent on an ambient air temperature of the ambient atmosphere surrounding the cooking device and an ambient dew point of the ambient atmosphere surrounding the cooking device, and (H) is the specific humidity at the fluid surface.

In other implementations, the cooking appliance 102 can comprise convection air ovens, convection humidity or steam ovens, convection microwave ovens, heated mixers, heated blenders, and toasters. In these implementations, the container 104 is filled with a fluid 10, such as air with or without water vapor, and the cooking device 200 is integrated with the cooking appliance, for example as a heating element in a convection air oven, as a microwave generator in a convection microwave oven, or a heating element in the slot of a toaster. The cooking device 200 is in fluid communication with the liquid 10, being air in the cavity or slot, and as the cooking device 200 heats the liquid 10, the food item 12 can be cooked according to the predictive cooking methods disclosed herein. In these cases where the cooking device 200 is integrated with the cooking appliance 102, the size of the container 102 may be predetermined and set as a constant at manufacture, and does not need to be entered by the user.

In yet other implementations, the cooking appliance 102 can comprise a regular or pressure pot used with an induction cooker. In these implementations, the container 104 is filled with a fluid 10, such as saturated steam, and the cooking device 200 is the induction plate inducing heating of the regular or pressure port. The cooking device 200, being the induction cooker, is in energetic communication with the pot, and thereby the liquid 10, and as the cooking device 200 heats the liquid 10, the food item 12 can be cooked according to the predictive cooking methods disclosed herein.

In yet another implementation, the cooking device 200 for cooking a food item in a container 104 containing a fluid 10 includes a temperature sensor 211 for providing a temperature measurement, a pressure sensor 212 for providing an ambient pressure measurement, a second pressure sensor (not shown) for providing a container pressure measurement, and a humidity sensor (not shown) for providing a humidity measurement. The temperature sensor 211 may be suitable for providing a temperature measurement of the fluid 10 and/or a heater 210 and/or a heating element of the heater 210. The cooking device 200 also includes at least one memory device 110 for storing executable instructions for operating the cooking device 200. The cooking device 200 also includes at least one processor 213 adapted to execute the executable instructions. The processor 213 controls a heater 210, optionally including a heating element, for heating the fluid 10 according to heater control information related to a set point temperature and a heater operation period. The set point temperature is the temperature to which the heater 210 seeks to heat the fluid 10 to. The heater operation period is the period of time for which the heater 210 is set to operate toward the set point temperature.

The processor 213 is adapted to receive food item information indicative of one or more characteristics of the food item to be cooked in the fluid, as well as a desired food temperature. Similarly, the processor 213 is adapted to obtain the temperature measurement from the temperature sensor 211, to obtain the ambient pressure measurement from the pressure sensor 212, to obtain the container pressure measurement from the second pressure sensor, and to obtain the humidity measurement from the humidity sensor.

The processor 213 is also adapted to facilitate determination of a measurement of power delivered to the heater based on the heater control information. For example, the processor 213 may provide the specifications of the heater 210 and a voltage, current, and/or duty cycle information to a cloud server (not shown) to determine the measurement of power delivered to the heater based on the heater control information. Alternatively, the cloud server may retain and/or access this information from previous determinations. In a further alternative, the processor 213 may perform the determination of the measurement of power delivered based on the heater control information.

The processor 213 is adapted to facilitate determination of one or more process parameters related to one or more corresponding physical characteristics of at least one of the fluid and the container based on at least one of the temperature measurement and the measurement of power. For example, the processor 213 may provide the temperature measurement, the measurement of power, the ambient pressure measurement, the container pressure measurement, and/or the humidity measurement to a cloud server to determine the one or more process parameters. Alternatively, the cloud server may retain and/or access this information from previous determinations. In a further alternative, the processor 213 may perform the determination of the one or more process parameters locally.

The processor 213 is adapted to facilitate determination of a food temperature of the food item based on the one or more process parameters, the temperature measurement, and/or the measurement of power. For example, the processor 213 may provide the one or more process parameters, the temperature measurement, the measurement of power, the ambient pressure measurement, the container pressure measurement, and/or the humidity measurement to a cloud server to determine the food temperature. Alternatively, the cloud server may retain and/or access this information from previous determinations. In a further alternative, the processor 213 may perform the determination of the food temperature locally.

The processor 213 is adapted to facilitate determination of updated heater control information based on the food temperature, the one or more process parameters, the temperature measurement, and/or the measurement of power. For example, the processor 213 may provide the food temperature, the one or more process parameters, the temperature measurement, the measurement of power, the ambient pressure measurement, the container pressure measurement, and/or the humidity measurement to a cloud server to determine the updated heater control information. Alternatively, the cloud server may retain and/or access this information from previous determinations. In a further alternative, the processor 213 may perform the determination of the updated heater control information locally.

The processor 213 is also adapted to control the heater 210 according to the updated heater control information until the food temperature substantially reaches the desired food temperature.

The processor 213 is also adapted to receive container information indicative of at least one of a container type and a container size of the container 104. The processor 213 is adapted to facilitate determination of the one or more process parameters at least based on the container information. The container information may be included in a name, number, or bar code positioned on the container 104.

In some implementation, the cooking device 200 may include the container 104. In some implementations the cooking device 200 includes the heater 210.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

In FIG. 1, network 112 can be a local area network (LAN) or a wide area network (WAN), but can also be other wired or wireless networks. Network 112 may be the Internet or some other public or private network. Client computing devices 106 can be connected to network 112 through a network interface, such as by wired or wireless communication. The techniques disclosed herein can be implemented on one or more processors. For example, the system can be implemented on one or more networked processors 108, the cooking device processor 213, a processor of an associated client computing device 106, or any suitable combination thereof.

Figure 9:
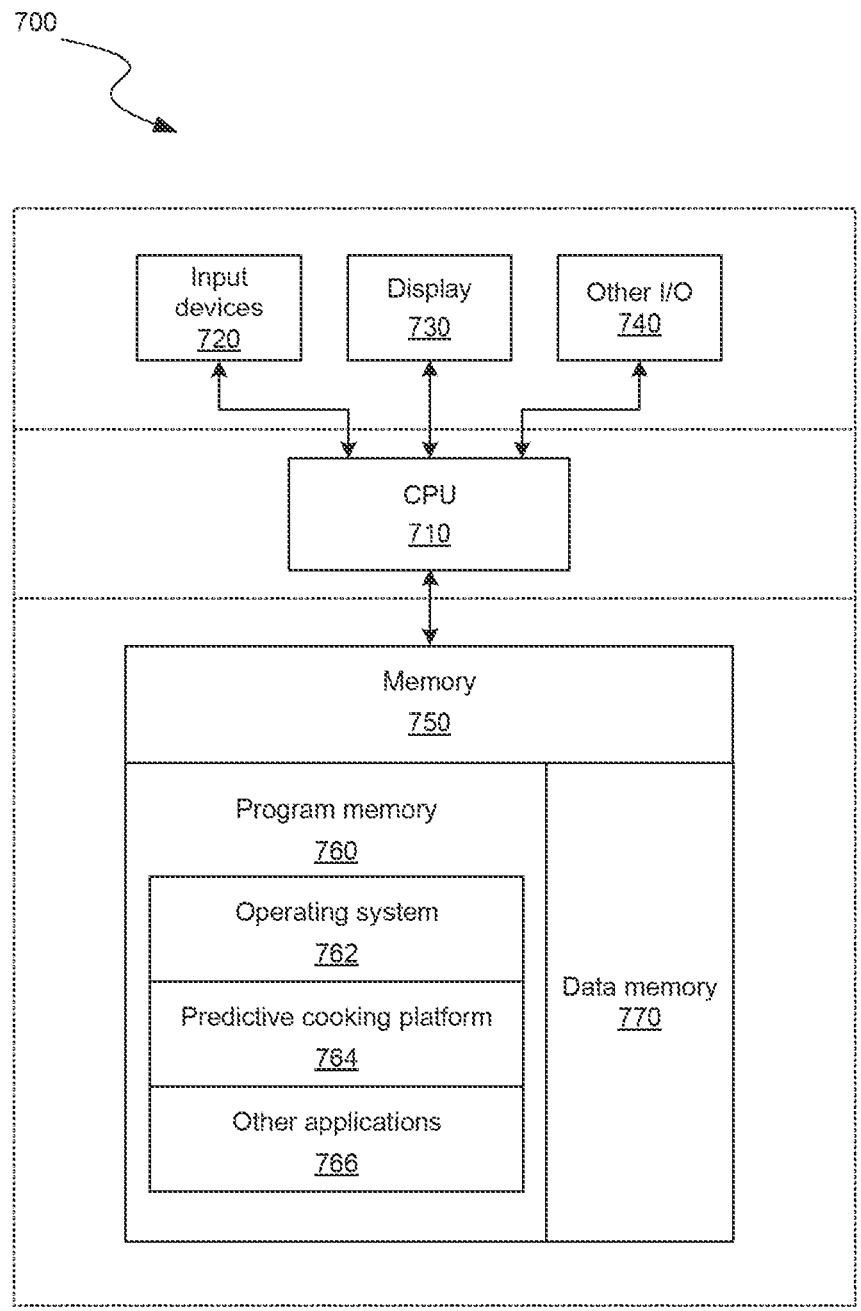
FIG. 9 is a block diagram illustrating an overview of devices on which some implementations can operate.

Several implementations are discussed below in more detail in reference to the figures. Turning now to the figures, FIG. 9 is a block diagram illustrating an overview of devices on which some implementations of the disclosed technology can operate. The devices can comprise hardware components of a device 700 that determines optimal cooking programs. Device 700 can include one or more input devices 720 that provide input to the CPU (processor) 710, notifying it of actions. The actions are typically mediated by a hardware controller that interprets the signals received from the input device and communicates the information to the CPU 710 using a communication protocol. Input devices 720 include, for example, a mouse, a keyboard, a touchscreen, an infrared sensor, a touchpad, a wearable input device, a camera- or image-based input device, a microphone, or other user input devices.

CPU 710 can be a single processing unit or multiple processing units in a device or distributed across multiple devices. CPU 710 can be coupled to other hardware devices, for example, with the use of a bus, such as a PCI bus or SCSI bus. The CPU 710 can communicate with a hardware controller for devices, such as for a display 730. Display 730 can be used to display text and graphics. In some examples, display 730 provides graphical and textual visual feedback to a user. In some implementations, display 730 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 740 can also be coupled to the processor, such as a network card, video card, audio card, USB, FireWire or other external device, camera, printer, speakers, CD-ROM drive, DVD drive, disk drive, or Blu-Ray device.

In some implementations, the device 700 also includes a communication device capable of communicating wirelessly or wire-based with a network node. The communication device can communicate with another device or a server through a network using, for example, TCP/IP protocols. Device 700 can utilize the communication device to distribute operations across multiple network devices.

The CPU 710 can have access to a memory 750. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 760 that stores programs and software, such as an operating system 762, predictive cooking platform 764, and other application programs 766. Memory 750 can also include data memory 770 that can include start time, completion time, user preferences such as tenderness of meat, etc., which can be provided to the program memory 760 or any element of the device 700.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 10:
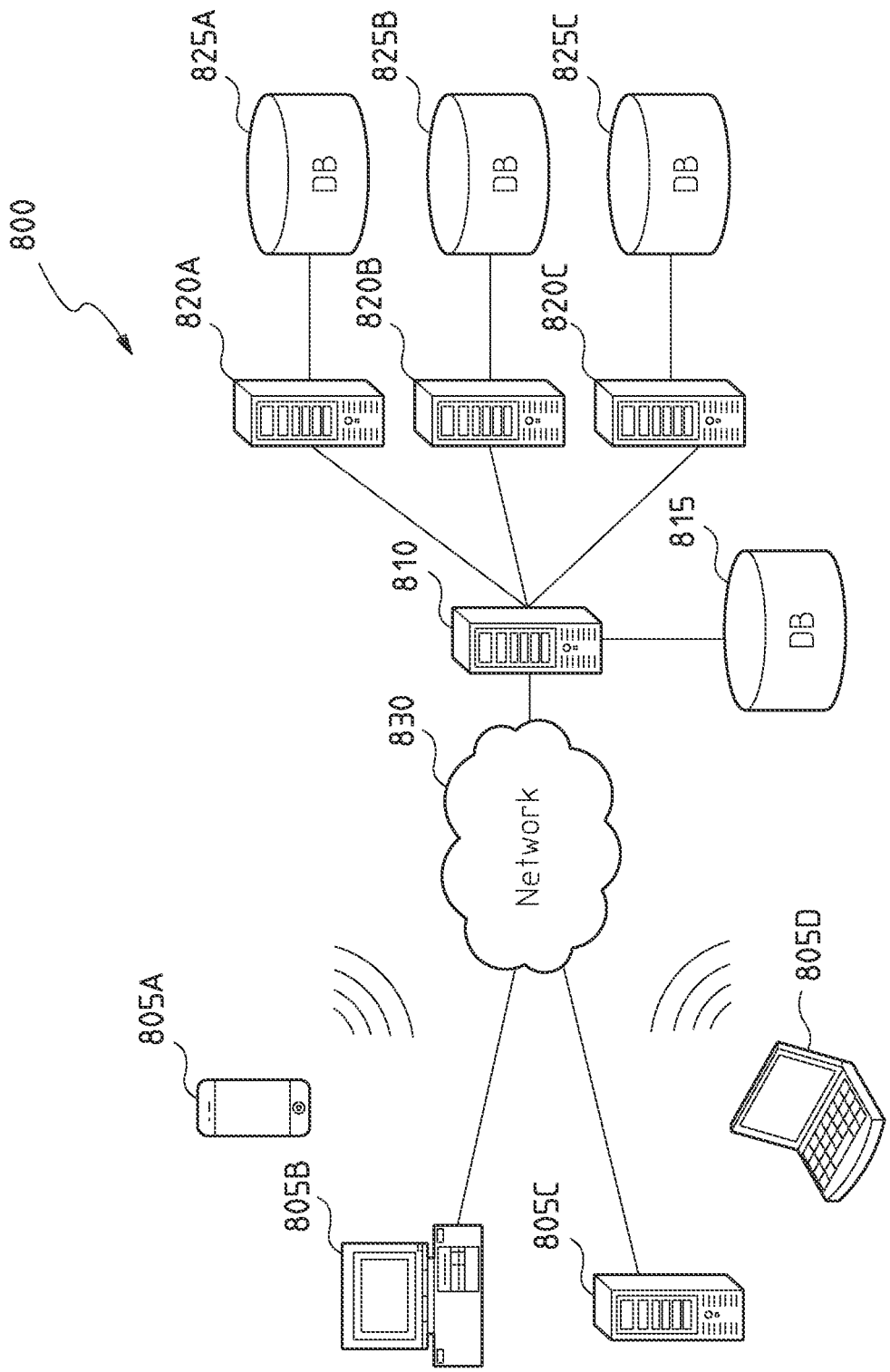
FIG. 10 is a block diagram illustrating an overview of an environment in which some implementations can operate.

FIG. 10 is a block diagram illustrating an overview of an environment 800 in which some implementations of the disclosed technology can operate. Environment 800 can include one or more client computing devices 805A-D, examples of which can include device 700. Client computing devices 805 can operate in a networked environment using logical connections through network 830 to one or more remote computers, such as a server computing device 810.

In some implementations, server computing device 810 can be an edge server that receives client requests and coordinates fulfillment of those requests through other servers, such as servers 820A-C. Server computing devices 810 and 820 can comprise computing systems, such as device 700. Though each server computing device 810 and 820 is displayed logically as a single server, server computing devices can each be a distributed computing environment encompassing multiple computing devices located at the same or at geographically disparate physical locations. In some implementations, each server computing device 820 corresponds to a group of servers.

Client computing devices 805 and server computing devices 810 and 820 can each act as a server or client to other server/client devices. Server 810 can connect to a database 815. Servers 820A-C can each connect to a corresponding database 825A-C. As discussed above, each server 820 can correspond to a group of servers, and each of these servers can share a database or can have their own database. Databases 815 and 825 can warehouse (e.g., store) information such as start time, completion time, and user preferences. Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN), but can also be other wired or wireless networks. Network 830 may be the Internet or some other public or private network. Client computing devices 805 can be connected to network 830 through a network interface, such as by wired or wireless communication. While the connections between server 810 and servers 820 are shown as separate connections, these connections can be any kind of local, wide area, wired, or wireless network, including network 830 or a separate public or private network.

Figure 11:
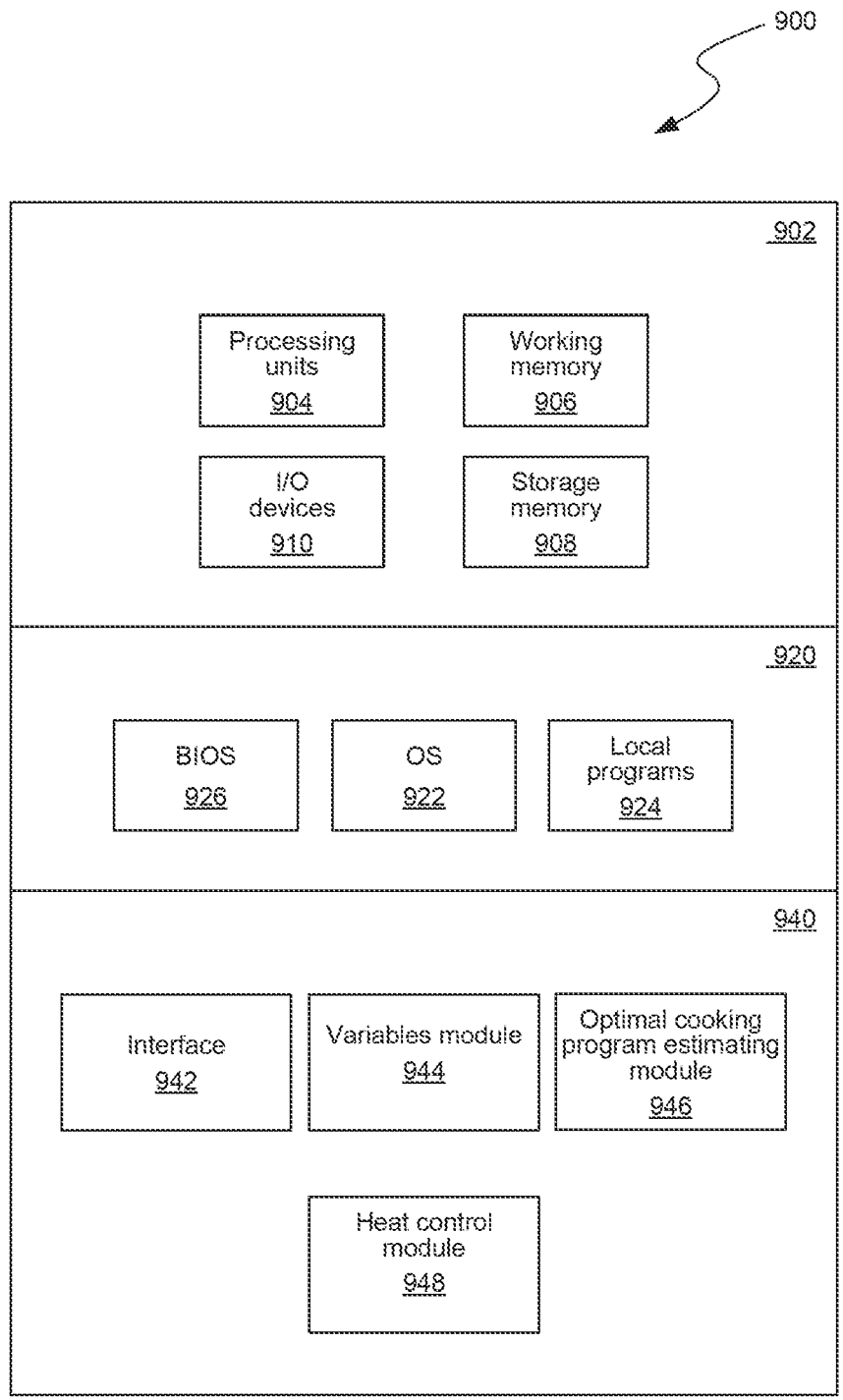
FIG. 11 is a block diagram illustrating components which, in some implementations, can be used in a system employing the disclosed technology.
Figure 12:
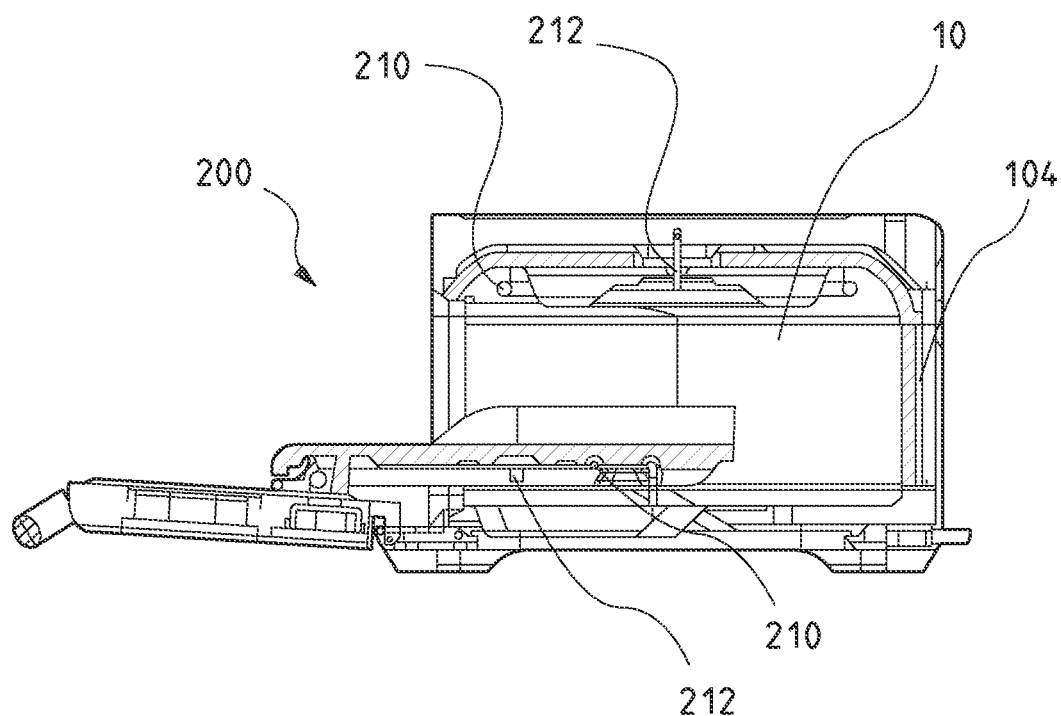
FIG. 12 is an isometric view of an alternative representative cooking device.

FIG. 11 is a block diagram illustrating components 900 which, in some implementations, can be used in a system employing the disclosed technology. The components 900 include hardware 902, general software 920, and specialized components 940. As discussed above, a system implementing the disclosed technology can use various hardware, including processing units 904 (e.g., CPUs, GPUs, APUs, etc.), working memory 906, storage memory 908, and input and output devices 910. Components 900 can be implemented in a client computing device such as client computing devices 805 or on a server computing device, such as server computing device 810 or 820.

General software 920 can include various applications, including an operating system 922, local programs 924, and a basic input output system (BIOS) 926. Specialized components 940 can be subcomponents of a general software application 920, such as local programs 924. Specialized components 940 can include variables module 944, optimal cooking program estimating module 946, heat control module 948, and components that can be used for transferring data and controlling the specialized components, such as interface 942. In some implementations, components 900 can be in a computing system that is distributed across multiple computing devices or can be an interface to a server-based application executing one or more of specialized components 940.

Those skilled in the art will appreciate that the components illustrated in FIGS. 9-11 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including U.S. patent application Ser. No. 16/116,460, filed on Aug. 29, 2018 and U.S. patent application Ser. No. 17/271,538, which is a national phase application of PCT No. PCT/US19/48757 filed Aug. 29, 2019 are incorporated herein by reference, in their entirety. Aspects of the embodiments can be modified, if necessary to employ concepts of the various patents, applications and publications to provide yet further embodiments.

The invention claimed is:

1. A method of cooking a food item in a fluid, the method including the steps of:
   receiving food item information indicative of one or more characteristics of the food item to be cooked in the fluid;
   receiving a desired food temperature;
   receiving information related to a predetermined acceptable temperature gradient across the food item, wherein the predetermined acceptable temperature gradient is a change in temperature of the food item from a surface of the food item to a core of the food item;
   controlling a heater for heating the fluid according to heater control information related to a set point temperature and a heater operation period;
   obtaining a temperature measurement of the fluid and/or the heater;
   determining a measurement of power delivered to the heater;
   determining one or more process parameters related to one or more corresponding physical characteristics related to an environment surrounding the food item based on at least one of the temperature measurement and the measurement of power;
   determining a food temperature estimate of the food item based on the one or more process parameters, the temperature measurement, and/or the measurement of power;
   determining updated heater control information based on the food temperature estimate, the one or more process parameters, the temperature measurement, and the measurement of power such that:
      the food item substantially reaches the desired food temperature while maintaining or subceeding the predetermined acceptable temperature gradient across the food item; and
      after the heater operation period, the fluid cools to substantially the desired food temperature within a predetermined time period, and the food item substantially reaches the desired food temperature within the predetermined time period; and
   controlling the heater according to the updated heater control information until the food temperature estimate substantially reaches the desired food temperature.

2. The method of claim 1, the method further including the step of:
   wirelessly receiving the information related to the predetermined acceptable temperature gradient across the food item via a user device, wherein the user device includes a mobile phone or a tablet.

3. The method of claim 1, the method further including the step of:
   providing feedback information to the user device related to the predetermined acceptable temperature gradient.

4. The method of claim 1, wherein the predetermined time period includes a user-specified time.

5. The method of claim 1, the method further including the step of:
   estimating at least one of a container type and a container size of a container based on the one or more process parameters,
   wherein the one or more process parameters include at least one of a fluid volume value indicative of a fluid volume in the container, a container thermal conductivity value indicative of a thermal conductivity of the container, or an evaporative loss value indicative of the evaporative heat transfer from at least one or more of the container, the food item, or the fluid.

6. The method of claim 1, the method further including the step of:
   receiving container information indicative of at least one of a container type and a container size of a container; and
   determining the one or more process parameters based on the container information.

7. The method of claim 6, wherein the container information is included in a name, a number, or a bar code positioned on the container.

8. The method of claim 1, the method further including the step of:
   detecting a change in the temperature measurement and a change in the measurement of power to determine that the food item is placed in a container.

9. The method of claim 8, the method further including the step of:
   determining the updated heater control information in response to the determination that the food item is placed in the container occurring before the temperature measurement indicates that the fluid has reached the set point temperature.

10. The method of claim 1, the method further including the step of:
   determining a pasteurization time period based on the desired food temperature and the information indicative of one or more characteristics of the food item; and
   determining updated heater control information to control the heater to maintain the food temperature estimate at substantially the desired food temperature for the pasteurization time period.

11. The method of claim 1, the method further including the steps of:
   receiving geographic location information from the user device and determining an estimated ambient atmospheric pressure based on an altitude of the geographic location; and
   determining the one or more process parameters using at least the estimated ambient atmospheric pressure.

12. The method of claim 1, the method further including steps of:
   obtaining an ambient atmospheric measurement from a pressure sensor; and
   determining of the one or more process parameters using at least the ambient atmospheric pressure measurement.

13. The method of claim 1, the method further including the steps of:
   obtaining a container pressure measurement of a pressure within a container containing the food item from a second pressure sensor; and
   determining the one or more process parameters using at least the container pressure measurement.

14. The method of claim 1, the method further including the step of:
   determining at least a fluid volume value indicative of a volume of fluid within a container containing the food item, a container thermal conductivity value indicative of a thermal conductivity of the container, or an evaporative loss value indicative of the evaporative heat transfer from at least one or more of the container, the food item, or the fluid, by fitting a predetermined physical model to at least one of the temperature measurement and the measurement of power.

15. The method of claim 14, wherein the physical model is:

$$\frac{dT}{dt} \approx c_1(P-F) - c_2 T + c_3 - c_4 H(T)$$

where (F) is an energy going into the food item, (c1) is the fluid volume value, (c2) is the container thermal conductivity value, (c3) is an offset dependent on an ambient air temperature and an ambient dew point, (c4) is the evaporative loss value, and (H) is a specific humidity at a surface of the fluid.

16. The method of claim 15, wherein the method further includes the step of:
   determining the fluid volume value, the container thermal conductivity value, and/or the evaporative loss value using one of a least squares method or a Kalman filter method applied to the physical model.

17. The method of claim 1, wherein the set point temperature is greater than the desired food item temperature.

18. The method of claim 1, wherein the temperature measurement includes a temperature measurement of the fluid.

19. The method of claim 1, wherein the temperature measurement includes a temperature measurement of a heating element of the heater, and wherein the method further includes the step of:
   determining the updated heater control information such that:
      the food item substantially reaches the desired food temperature while maintaining or subceeding the predetermined acceptable temperature gradient across the food item; and
      after the heater operation period, the heating element cools to substantially the desired food item temperature within a predetermined time period, and the food item substantially reaches the desired food temperature within the predetermined time period.

* * * * *